United States Patent [19]

Rabedeau

[11] 4,304,467

[45] Dec. 8, 1981

[54] FOCUSSED LASER BEAM OPTICAL SYSTEM

[75] Inventor: Melbourne E. Rabedeau, Saratoga, Calif.

[73] Assignee: International Business Machines Corporation, Armonk, N.Y.

[21] Appl. No.: 43,185

[22] Filed: May 29, 1979

[51] Int. Cl.³ .............................................. G02B 9/00
[52] U.S. Cl. .................................................... 350/449
[58] Field of Search ................. 350/206, 6.1, 6.2, 6.3, 350/6.4, 6.91; 331/94.5 R

[56] References Cited

U.S. PATENT DOCUMENTS

| | | | |
|---|---|---|---|
| 3,750,189 | 7/1973 | Fleischer | 346/74 ES |
| 3,787,107 | 1/1974 | Sick et al. | 350/6.8 |
| 3,801,182 | 4/1974 | Jones | 350/6.8 |
| 3,980,397 | 9/1976 | Judd et al. | 350/162 R |
| 4,030,817 | 6/1977 | Westell | 350/314 |

FOREIGN PATENT DOCUMENTS 2040507 1/1971 France .

OTHER PUBLICATIONS

Holmes, D. A., et al., "Parametric Study of Apertured Focused Gaussian Beams," Applied Optics, vol. 11, No. 3, pp. 565-574, Mar. 1972.

Haskal, H. M., et al., "Power and Focusing Considerations for Recording with a Laser Beam in the TEMoo Mode" Applied Optics, vol. 10, No. 6, pp. 1354-1358, Jun. 1971.

Cox, A., *Optics*, The Focal Press, London & N.Y. pp. 68-73, Apr. 1957.

Pernick, B. J., "Irradiance Uniformity and Power Loss . . . ", Rev. Sci. Instr. vol. 45, Nr 11, Nov. 1974, 1344-1346.

Primary Examiner—John K. Corbin
Assistant Examiner—Scott J. Sugarman
Attorney, Agent, or Firm—George E. Roush

[57] ABSTRACT

The focal range of a focussed laser beam is enlarged with a simple optical stop where the beam has a Gaussian cross-sectional profile. The stop is arranged between the laser producing the beam, and a beam focussing lens system, and it is provided with an aperture of predetermined diameter with respect to that of the laser beam whereby the outer portion of the beam represented by the low intensity skirts of the profile curve is stopped. This arrangement can influence the focal range up to a 75 percent increase over that obtained with the unstopped beam.

4 Claims, 4 Drawing Figures

FOCUSSED LASER BEAM OPTICAL SYSTEM

FIELD

The invention relates to optical systems for focussing laser beams on a given target, and it particularly pertains to a system for increasing the focal range at the target.

BACKGROUND

Focussed laser beams are used extensively. One important application is that of the point-of-sale recording system wherein coded labels are scanned with a focussed laser beam and wherein there is always considerable uncertainty as to the distance between the focussing lens and the surface over which scanning takes place. Another important application is found in the high-speed, high-resolution laser printing system wherein there is less tolerance of the uncertainty that does exist to the end that this problem is equally severe in practice.

PRIOR ART

Past attempts to solve this problem have resorted to refinements of old optical systems that are expensive, bulky and difficult in manufacture and/or adjustment in the field.

There appears to be little in the prior art. Some illusory similarity is found in U.S. Pat. No. 4,030,817 issued in June 1977, to William E. Westell (class 350/314). Here a filter is arranged to define a beam of light in an optical system wherein the central portion of the beam has a substantially uniform profile and the outer portion has a Gaussian profile. Thus the arrangement is actually quite dissimilar to the invention as will be seen immediately hereinafter.

SUMMARY

The objects referred to indirectly hereinbefore, and those that will appear as the specification progresses, are attained in an optical system comprising a device generating a laser beam having a Gaussian cross-sectional profile, and a beam focussing device by the interposition of an optical stop in the laser beam between the devices. More particularly, the stop is arranged with an aperture stopping the beam at the skirts of the characteristic profile. Fundamentally, this stop is effective to extend the focal range of the beam at the target. Preferably, the aperture is dimensioned to truncate the laser beam in accordance with the requirements of the application at hand; it is possible to extend the focal range by up to 75 percent over that of the unstopped beam while substantially maintaining the same focussed spot size.

DRAWING

In order that full advantage of the invention obtain in practice, the best mode embodiment thereof, given by way of example only, is described in detail hereinafter with reference to the accompanying drawing, forming a part of the specification, and in which.

DESCRIPTION

Figure 1:
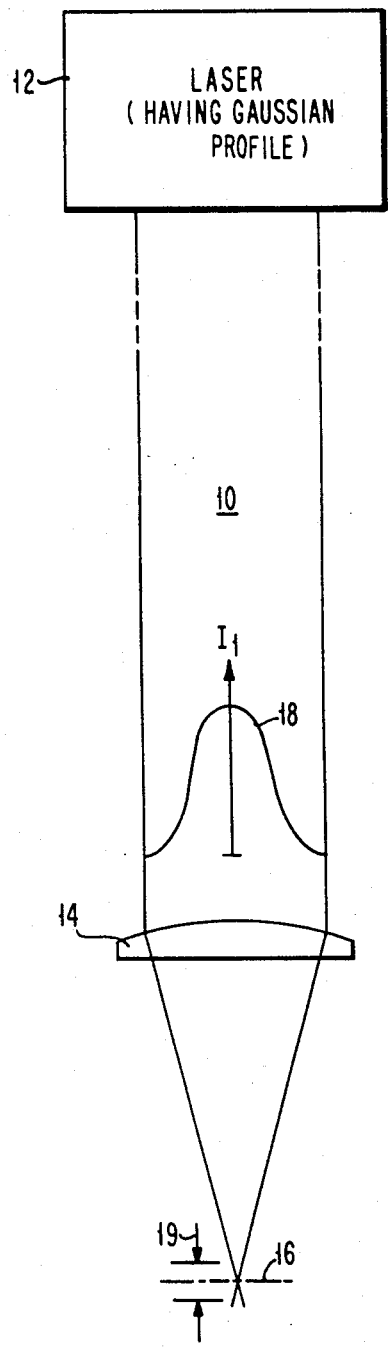
FIG. 1 is a schematic diagram of a conventional focussed laser beam optical system.

A conventional focussed laser beam optical system is shown in FIG. 1. A laser beam 10, emanating from a laser 12, is arranged to pass a focussing lens system, schematically represented here as a single lens 14 for bringing the beam to a focus at a desired target in a given plane, represented here by a line 16. The laser beam 10 has a Gaussian profile diametrically as represented here by a curve 18 superimposed on the diagram. A range of focus of the system as described is represented by the dimension 19.

Figure 2:
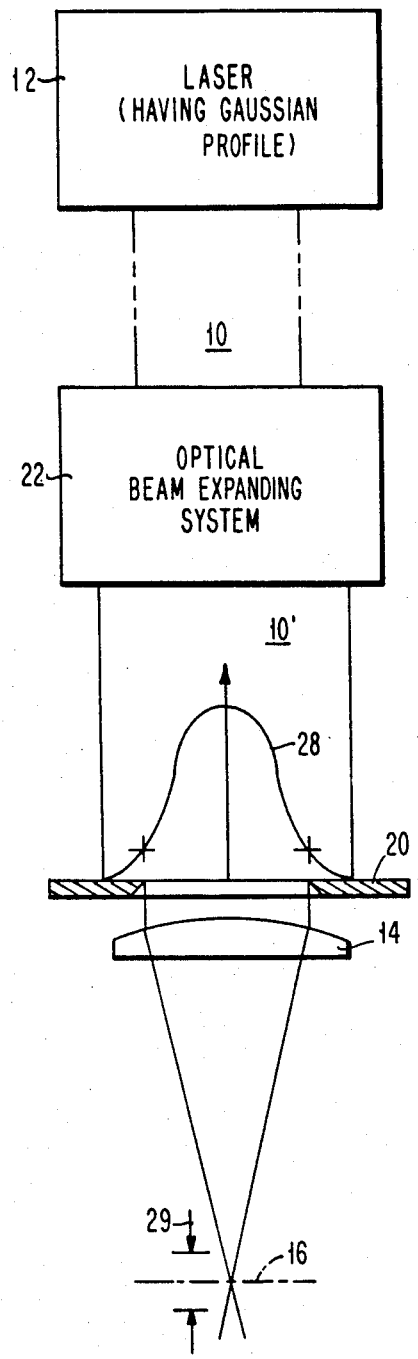
FIG. 2 is a schematic diagram of a focussed laser beam optical system according to the invention.

In accordance with the invention, the range of focus of the system as shown and described, is increased by interposing an optical stop between the laser 12 and the focussing lens system 14. It should be clearly understood that the focussing lens system 14 and the optical stop 20 are located as shown, or the stop 20 and the lens system 14 may be exchanged. Also the optical stop 20 alternatively is located between component lenses of a plural element focussing lens system. The stop has an aperture related to the diameter of the beam 10 and the profile represented by the curve 18. The relationship will be discussed in greater detail hereinafter. While the basic arrangement is so readily described, it will more readily be understood with reference to FIG. 2. Here an optical stop 20 is shown in place not only with respect to the focussing lens system 14, but also with respect to an optical beam expanding system 22 which is interposed between the laser 12 and the optical stop 20. Because lasers are available usually in a few more or less standard beam diameters which are not always optimum for the application at hand, it is good practice to use optical beam expanding systems for most applications. The expanded laser beam 10' has a Gaussian profile characteristic represented by a curve 28 and the optical stop 20 is chosen in accordance with this characteristic curve 28 as will be discussed hereinafter.

The principal object is to maintain the laser spot size at or near the desired target substantially constant over the entire scan field. As mentioned hereinbefore, it was found empirically, that truncating a laser beam resulted in a desirable increase in the focal range. Investigation with the aid of a computer verified the result, and a computer program was developed for optimizing the arrangement according to the invention.

ANALYSIS

A "line spread" function is defined as the two dimensional energy distribution in the focussed spot integrated in one direction. It is, therefore, the curve of the transmitted energy against the distance obtained, were the focussed spot scanned over a narrow slit situated normally to the direction of motion of the spot. Data were obtained on the line spread function width as a function of the degree of defocussing by means of a computer. These data were used to plot the curves of line spread function width at the $\frac{1}{2}$ intensity and the $1/e^2$ intensity levels. It is convenient in optical work of the type encountered with optical systems of the invention to work with multiples of $e^{-n}$, where e is the natural logarithm 2.7182. Thus, the value of $e^{-2} = 0.135$ is used for one of the energy levels as well as the half intensity level (0.500). For each degree of truncation, the calculation was made for an adjusted beam aperture size that produces the same in-focus line spread function $\frac{1}{2}$ peak width, as would be obtained with the in-focus untruncated beam.

Figure 3:
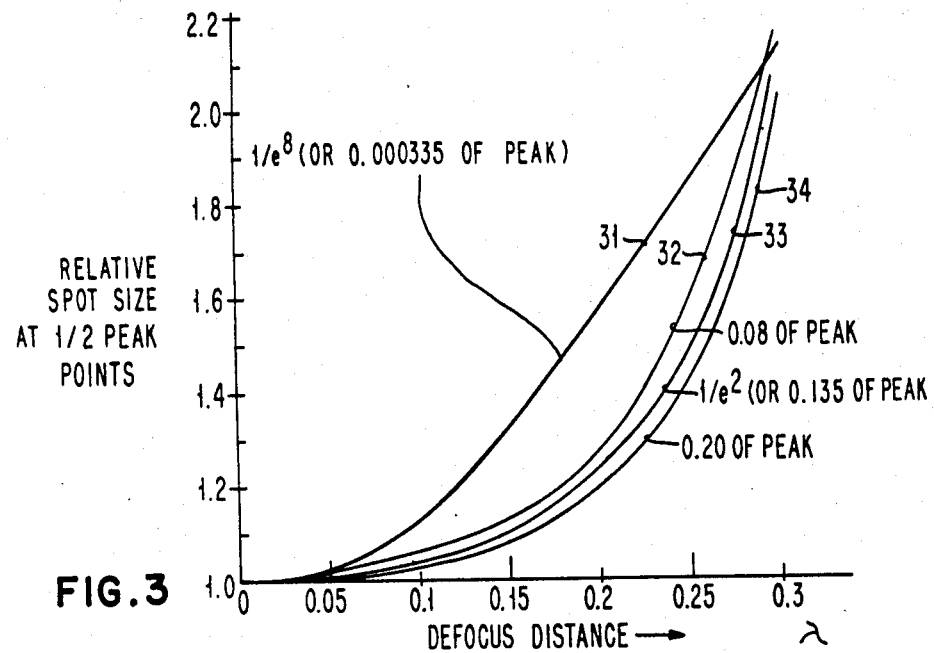
FIGS. 3 and 4 are graphical representations of the operation of an optical system according to the invention.

FIG. 3 is a graphical representation of a line spread function width at ½ peak points as a function of the distance from an ideal focus point for a range of defocussing.

Curves 31, 32, 33 and 34 respectively represent the truncation of the beam at the radius where the beam intensity is $1/e^8$ (or 0.03%), 0.08, $1/e^2$ (or 13.5%), and 0.2 of the peak intensity. The curve 31 for truncation at $1/e^8$ is essentially identical to that for the untruncated beam. The abscissa of this plot is also the number of wavelengths of defocussing of the untruncated beam measured at the $1/e^2$ intensity points in the exit pupil of the focussing lens.

Figure 4:
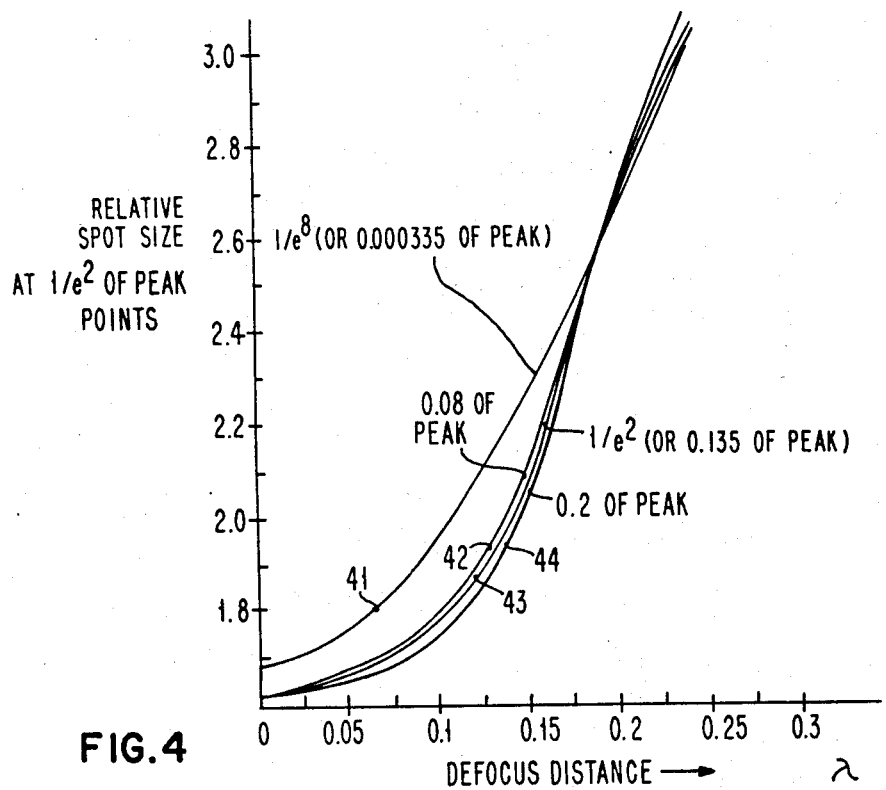

FIG. 4 is a graphical representation of the line spread function widths measured at the $1/e^2$ (or 13.5% of peak) intensity points, as a function of distance from ideal focus. Curves 41, 42, 43 and 44 correspond to the levels as listed above.

As can be seen from FIGS. 3 and 4, a considerable improvement in focal range is obtained by truncating the beam if the allowable spot size tolerance in the scanner or optical system is between zero and thirty or forty percent of the spot size. In one printer where the spot size tolerance is 10 percent of the spot size, the focal range is increased by about 50 percent by truncating the beam at the radius where the intensity is 0.2 of that of the peak intensity. With a system in which the alignment and focussing of the system is difficult because of the limited focal range, this increase in focal range results in considerably reduced time required to align and focus the system.

While decreasing the optical stop diameter in the conventional camera lens also will act to increase the focal range, the arrangement according to the invention will do so without substantially changing the spot sizes, whereas the spot will bloom in the former arrangement.

While the invention has been described in terms of a preferred embodiment, and changes and variations have been suggested, it should be clearly understood that those skilled in the art will make further changes in their applications without departing from the spirit and scope of the invention as defined in the appended claims concluding the specification.

The invention claimed is:

1. A focussed laser beam optical system providing increased focal range, comprising
   a laser for generating a beam of coherent light having a given diameter and a guassian profile diametrically,
   a focussing lens system aligned with said laser for bringing the light in said beam of light to a focus, and
   an optical stop aligned with said lens system and having an aperture of diameter at which the density of said beam of light is 0.08 to 0.20 of the peak intensity of said beam of light,
   whereby the focal range is substantially greater than for the original focussed beam.

2. A focussed laser beam optical system providing increased focal range, comprising
   a laser for generating a beam of coherent light having a given diameter and a gaussian profile diametrically,
   a focussing lens system aligned with said laser for bringing the light in said beam to a focus, and
   an optical stop aligned with said laser and said lens system and having an aperture of diameter at which the intensity of said beam of light is 0.20 of the peak intensity of said beam of light,
   whereby the focal range is substantially greater than for the original focussed beam.

3. A focussed laser beam optical system providing increased focal range, comprising
   a laser for generating a beam of coherent light having a given diameter and a gaussian profile diametrically,
   a focussing lens system aligned with said laser for bringing the light in said beam to a focus, and
   an optical stop aligned with said laser and said lens system and having an aperture of diameter at which the intensity of said beam of light is 0.135 of the peak intensity of said beam of light.
   whereby the focal range is substantially greater than for the original focussed beam.

4. A focussed laser beam optical system as defined in claim 3, and incorporating
   an optical beam expanding system interposed between said laser generating apparatus and said optical stop.

* * * * *